United States Patent [19]

Sanford et al.

[11] Patent Number: 5,321,563

[45] Date of Patent: Jun. 14, 1994

[54] BIASING AND ERASING APPARATUS AND METHOD FOR MAGNETIC TAPE RECORDING DEVICES TO IMPROVE SIGNAL-TO-NOISE RATIO

[75] Inventors: Robert Sanford, Flower Mound; Robert Cook, Lewisville; Gerald Stuteville, North Richland Hills, all of Tex.

[73] Assignee: Tandy Corporation, Fort Worth, Tex.

[21] Appl. No.: 898,860

[22] Filed: Jun. 15, 1992

[51] Int. Cl.5 .......................... G11B 5/03; G11B 5/02
[52] U.S. Cl. ........................................ 360/66; 360/68
[58] Field of Search ................. 360/32, 48, 62, 63, 360/66, 68

[56] References Cited

U.S. PATENT DOCUMENTS

| | | |
|---|---|---|
| 3,947,642 | 3/1976 | Mayerle . |
| 4,504,874 | 3/1985 | Imai ........................ 360/66 |
| 4,616,273 | 10/1986 | Ishii et al. ...................... 360/66 |
| 4,837,644 | 6/1989 | Yunoki ................................ 360/66 |

FOREIGN PATENT DOCUMENTS

| | | |
|---|---|---|
| 57-130204 | 8/1982 | Japan . |
| 57-176506 | 10/1982 | Japan . |
| 58-118003 | 7/1983 | Japan . |

OTHER PUBLICATIONS

Snader, Earl E. Bias Oscillator Circuits Radio-Electronics, Jul. 1962.
Semiconductors, Transistors and Circuits, Buchsbaum, Sc.D., pp. 201-205, *Buchsbaum's Complete Handbook of Practical Electronic Reference Data*, Second Edition.
PCT Notification of Transmittal of the International Search Report or the Declaration, (Sep. 29, 1993), pp. 1-9.

*Primary Examiner*—Donald Hajec
*Assistant Examiner*—T. N. Forbus, Jr.
*Attorney, Agent, or Firm*—Cesari and McKenna

[57] ABSTRACT

A circuit for generating a bias signal and an erase signal for use in a recording apparatus having a record head for recording an input analog signal on a magnetic tape, and an erase head for erasing information from the tape. A DC erase signal is applied to the erase head in response to the erase control signal to cause the erase head to erase information. An AC bias signal is generated and is combined with the input analog signal to make a record signal. The record signal is applied to the record head in response to the record control signal to record information on the tape. A controller generates an erase control signal and as record control signal. The AC bias signal is generated by an AC bias oscillator, such as a Hartley oscillator to reduce the noise contributed in the recording system. Use of a DC source to drive the erase head reduces the cost of the circuit, while maintaining a significant increase in the signal-to-noise ratio.

28 Claims, 5 Drawing Sheets

BIASING AND ERASING APPARATUS AND METHOD FOR MAGNETIC TAPE RECORDING DEVICES TO IMPROVE SIGNAL-TO-NOISE RATIO

FIELD OF THE INVENTION

The present invention is related to an apparatus and method for recording analog signals on a magnetic tape. More particularly, the invention is related to magnetic tape recorders which require a bias signal to be added to an analog signal to be recorded so that the dynamic range of the magnetic tape is optimized. The present invention is particularly suitable for magnetic tape recorders used in telephone answering devices and other inexpensive recorders.

BACKGROUND OF THE INVENTION

Magnetic tape recorders, such as telephone answering devices, commonly use magnetic tapes on which analog signals are recorded. Such devices require a circuit which adds a bias signal to the recorded analog signal so that the dynamic range of the magnetic tape may be optimized. It is also necessary for such devices to incorporate additional circuits which are used to erase signals from the magnetic tapes so that new signals can be recorded.

Figure 1:
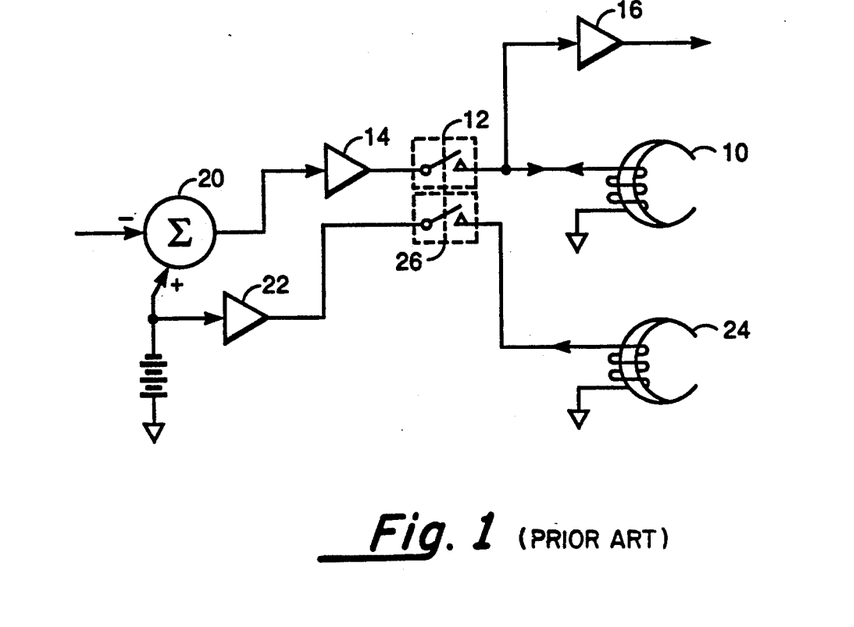
FIG. 1 is schematic block diagram of a biasing method commonly used in telephone answering devices.

In telephone answering devices and other low-cost recorders, the bias signal is normally provided by adding a DC voltage to the analog signal. A circuit for realizing this biasing method is shown schematically in FIG. 1. In FIG. 1 a record/playback head 10 is connected to input amplifier 14, via switch 12, and to output amplifier 16. When switch 12 is open, the device is in playback mode (i.e., the signals on the tape are reproduced) and an output signal is provided by the output amplifier 16. When switch 12 is closed, the record/playback head 10 is in record mode to record the analog signal on the tape. In this mode the record head 10 receives the analog input signal from amplifier 14. A DC voltage from DC bias source 18 is combined with the analog input signal by an adder circuit 20. This combined signal is provided to the record/playback head 10 via input amplifier 14.

In order to erase the tape, the DC voltage from DC bias source 18 is also received by an erase head 24 via an erase amplifier 22. A switch 26 is provided in order to disable erasing when the device is not intended to erase.

This biasing/erasing system is inexpensive and reliable and does not require careful adjustment or extensive maintenance. However, as is well-known, the DC method of biasing uses only part of the magnetization curve of the recording head 10. Consequently, the system typically provides a signal-to-noise (S/N) ratio of less than 30 decibels (dB). A careful investigation has revealed that the principle noise contributor in such a system is the DC bias arrangement itself.

Figure 2:
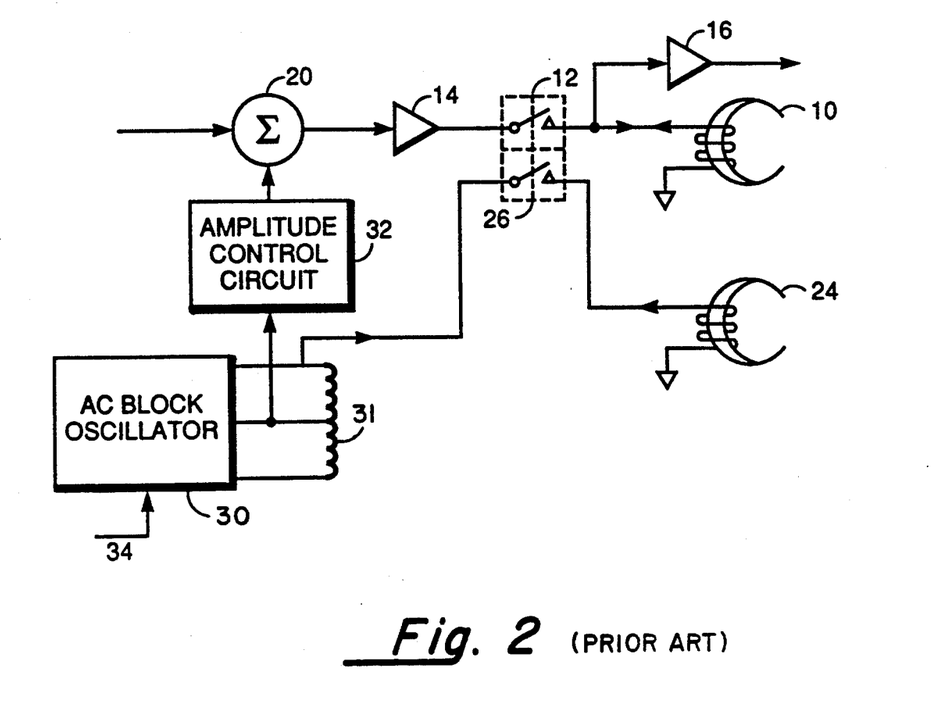
FIG. 2 is a schematic block diagram of a biasing method commonly used in high quality magnetic tape recorders.

By contrast, in high quality, professional, magnetic tape recorders, a biasing method known as AC biasing is used. A circuit embodying this method is shown in FIG. 2. The AC biasing method involves adding a large amplitude, fixed, supersonic, single frequency sinusoidal signal to the analog signal before coupling the signal to the record head 10. (Similar reference numbers in FIGS. 1 and 2 indicate similar structures.) In place of the DC bias source 18 (FIG. 1), the AC biasing method uses an AC bias oscillator 30. This oscillator provides a second bias signal to an amplitude control circuit 32. The amplitude control circuit 32 subsequently provides an AC biasing signal to the adder circuit 20 where the bias signal is combined with the analog signal to be recorded. The combined signal is provided, in turn, to an amplifier 14 and, via switch 12 to the record head 10 and output amplifier 16.

Oscillator 30 also provides a AC erase signal to the erase head 24 via a step up transformer 31 and a switch 26. The step up transformer is necessary to increase the erase signal voltage so that it completely saturates the tape in order to erase it completely. Due to the presence of the transformer, the AC signal provided to erase head 24 usually has a frequency equal to the frequency provided to bias the record head 10 or equal to an odd submultiple of the bias frequency.

The AC biasing/erasing arrangement is capable of producing superior sound quality when compared to the DC bias/erase arrangement discussed above—with such AC systems, S/N ratios of 60 to 70 dB can be achieved. However, during initial factory set up, the frequency of the AC bias oscillator 30 (typically 30 to 40 kHz), and the RMS value of the AC bias waveform (typically about 50 volts) must be carefully adjusted to maintain such high S/N ratios. In order to reduce distortion further, the oscillators must also be fine tuned so that the output waveform is symmetrical. In addition, the circuitry required to control the frequency and amplitude of the AC bias waveform is costly. Further, the step up transformer 31 contributes significantly to the cost of the erase circuit. Consequently, the conventional AC bias/erase circuit is generally too costly for relatively low cost magnetic tape recorders such as telephone answering devices and is only cost effective for expensive devices, such as professional quality magnetic tape recorders.

Accordingly, it is an object of the present invention to provide a biasing/erasing method and apparatus for a magnetic tape recording apparatus, especially telephone answering and other low cost recording devices, which method and apparatus improve the signal to noise (S/N) ratio over a conventional DC biasing/erasing system.

It is another object of the present invention to provide a biasing method and apparatus which improve the signal to noise (S/N) ratio over a conventional DC biasing/erasing system without greatly increasing the cost.

It is yet another object of the present invention to provide a biasing method and apparatus which utilize AC biasing for a high S/N ratio and which eliminate the need for a step up transformer in the erase circuit.

SUMMARY OF THE INVENTION

To accomplish the foregoing and other objects of the invention, there is provided a circuit for generating a bias signal and an erase signal for use in a recording apparatus having a record head for recording an input analog signal on a magnetic tape, and an erase head for erasing information from the tape. The circuit includes a controller for generating an erase control signal and as record control signal. A DC erase signal is applied to the erase head in response to the erase control signal to cause the erase head to erase information. An AC bias signal is generated and is combined with the input analog signal to make a record signal. The record signal is applied to the record head in response to the record control signal to record information on the tape. The AC bias signal is generated by an AC bias oscillator, such as a Hartley oscillator, which reduces the noise contributed in the recording system. Use of a DC source to drive the erase head reduces the cost of the circuit, while maintaining a significant increase in the signal to noise ratio.

Another embodiment of the invention is a magnetic tape recording apparatus having an erase head driven by a DC erase signal from a DC source and a record/playback head driven by an input signal biased with an AC bias signal from an AC bias oscillator.

In one embodiment of the invention, a Hartley oscillator is used as the AC bias oscillator. A transistor, whose collector is coupled to receive a positive supply voltage is used as the DC source providing an erase signal for driving the erase head.

Alternatively, the apparatus may include other types of AC bias oscillators and DC sources. For instance, a Clapp oscillator, a Colpitts oscillator, a master-clock divider or other simple oscillator circuit may be used as the AC bias oscillator.

The use of a DC source for the driving erase head eliminates the need for a step-up transformer and high-voltage switching, thereby significantly reducing the cost of the circuit. An increase in the S/N ratio is achieved, however. This circuit thus provides a higher quality magnetic tape recording apparatus at a lower cost. It has also been found that the AC bias signal need not be symmetrical to obtain a significant increase in S/N ratio, thereby eliminating the need for fine tuning required to make the signal symmetrical.

The addition of the bias signal to the input analog signal may be performed using a simple circuit, such as by feeding the input analog signal through a transformer in the AC bias oscillator.

DETAILED DESCRIPTION

A detailed description of embodiments of the present invention will now be provided. This description should be read in conjunction with the drawing, especially FIGS. 3-9. Similar reference numerals in the figures indicate similar structures.

Figure 3:
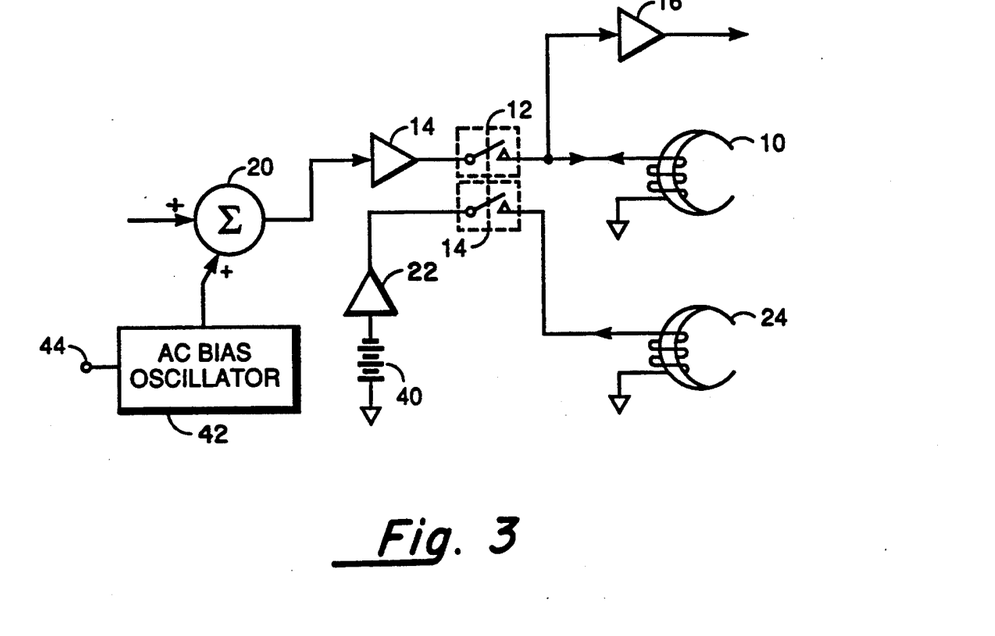
FIG. 3 is a schematic block diagram of a circuit embodying the present invention.

Referring now to FIG. 3, the invention includes an AC bias oscillator 42 for generating an AC bias signal to be added to the input signal by adder circuit 20 while maintaining a separate DC source 40 for driving the erase head 24 in a manner typically found in telephone answering devices (TAD's). The AC bias signal has a high frequency (typically 30–40 KHz) and nominal (typically 50 to 70 volts) RMS value.

With the biasing method described above, S/N ratios of 37 to 40 dB may be obtained, without additional changes to the audio system. The AC bias oscillator 42 need be neither fine tuned nor symmetric to obtain such S/N ratios; thereby reducing cost. The cost of the AC bias oscillator is further reduced in comparison to high quality, professional recording systems by the elimination of the erase windings on the step up transformer and an amplitude control circuit. The increase in cost of this biasing/erasing apparatus over the DC biasing method of other low cost magnetic tape recorders is also negligible.

Figure 4:
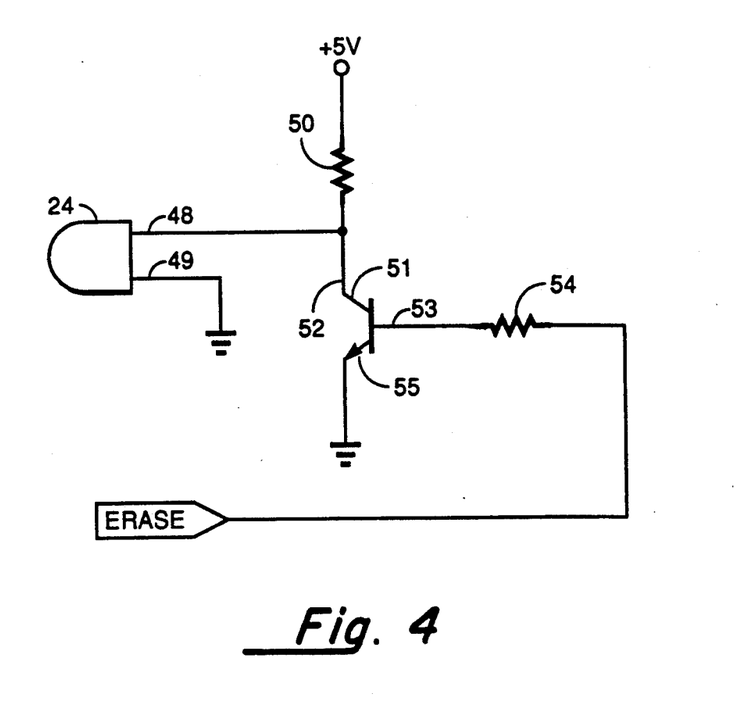
FIG. 4 is a more detailed schematic diagram of the DC bias circuit for an erase head.
Figure 5:
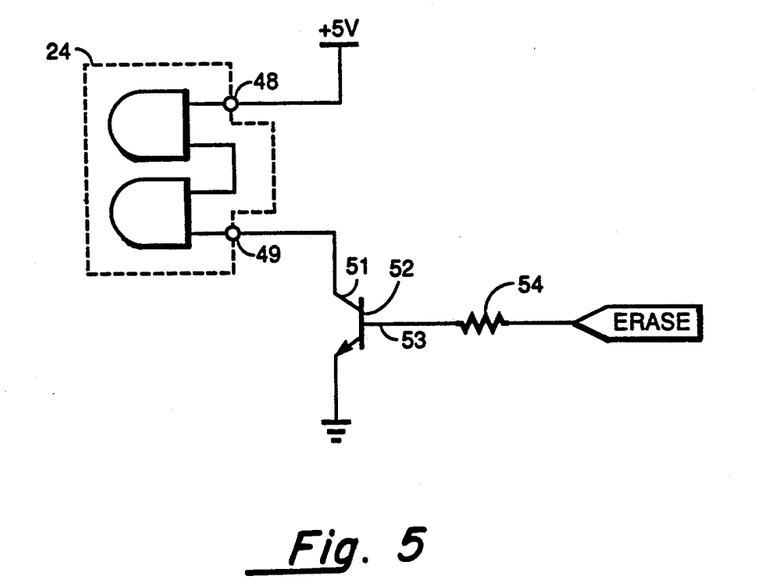
FIG. 5 is a more detailed schematic diagram of another embodiment of the DC bias source for the erase head.

Suitable embodiments of the DC source 40 and AC bias oscillator 42 for use in the invention are illustrated in FIGS. 4 through 9. FIGS. 4 and 5 illustrate two possible implementations of the DC erase source. It should be understood that other embodiments are possible; the ones shown are merely illustrative of the many embodiments.

In FIG. 4, a single tape deck embodiment is shown in which erase head 24 has one terminal 48 connected, via a resistor 50, to a DC supply voltage, indicated here as +5 volts. The other terminal 49 is connected to ground. A transistor 52 acts as a switch for enabling or disabling erasing To control the switching of the transistor, an erase control signal is applied to a resistor 54 which biases the base of transistor 52. In most applications, the erase control signal is likely to come from a digital control circuit (not shown). The emitter 55 of the transistor 52 is connected to ground. When the voltage of the erase control signal is sufficiently positive, transistor 52 turns on, thus making the current driving erase head 24 close to zero. When transistor 52 turns off, when the voltage of the erase control signal is sufficiently low, the erase head is driven by the current from the DC erase source 40 through resistor 50. A second erase head (not shown) could be added in series between the erase head 24 and ground for a dual deck embodiment.

In FIG. 5, an alternative dual deck embodiment of the DC bias method is shown. In this embodiment, terminal 48 of erase heads 24 is connected to receive a DC erase current, determined by a DC voltage, indicated here as +5 volts. Each of the two decks in this embodiment has one erase head 24. A single deck embodiment would have only one erase head 24. The other terminal 49 is connected to the collector 51 of a transistor 52 which acts as a switch for enabling or disabling erasing. To control the switching of the transistor 52 an erase control signal is applied to a resistor 54 which biases the base 53 of the transistor. The emitter 55 of the transistor is connected to ground. When the voltage of the erase control signal is sufficiently positive, transistor 52 turns on causing the voltage at collector 51 and thus terminal 49 to be low (near ground). Thus, current drives the erase head 24. When the voltage of the erase control signal is sufficiently low, transistor 52 turns off, thus preventing current from driving erase head 24.

When one of the decks is turned on, the tape in that deck is erased.

FIGS. 6 through 9 illustrate four possible embodiments of the AC bias oscillator. It should be understood that many other embodiments are possible, as should be evident to those of ordinary skill in this art, those shown being merely illustrative.

Figure 6:
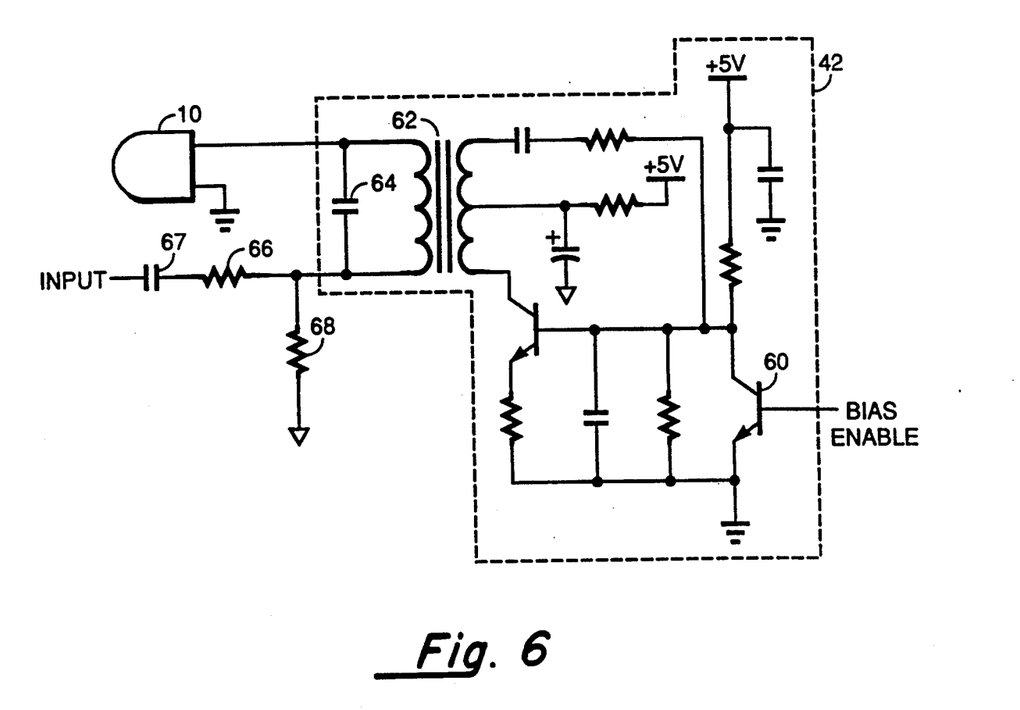
FIG. 6 is a more detailed schematic diagram of the AC bias oscillator for the record head of a magnetic tape device implemented as a Hartley oscillator.
Figure 7:
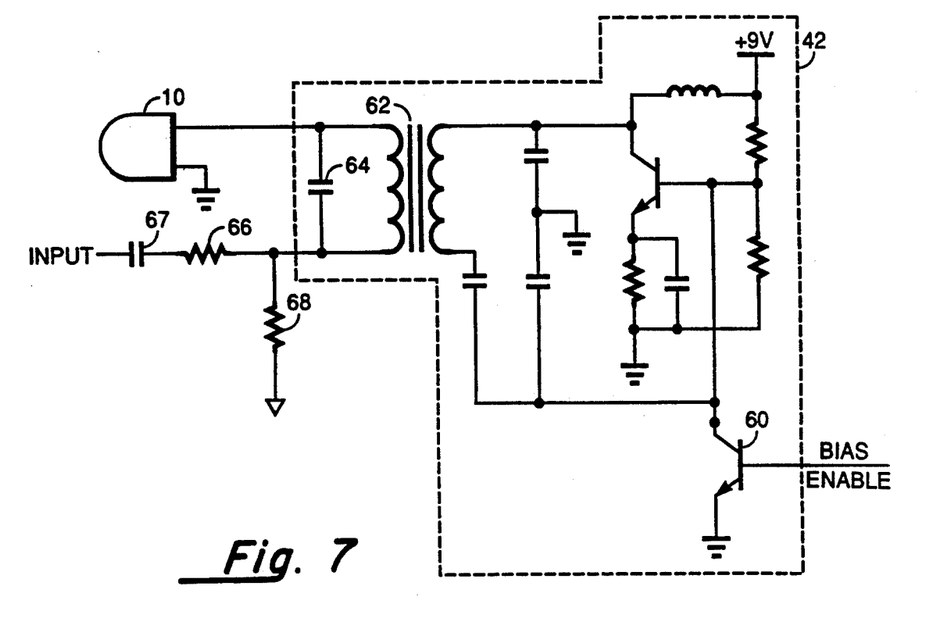
FIG. 7 is a more detailed schematic diagram of the AC bias oscillator for the record head of a magnetic tape device implemented as a Clapp oscillator.
Figure 8:
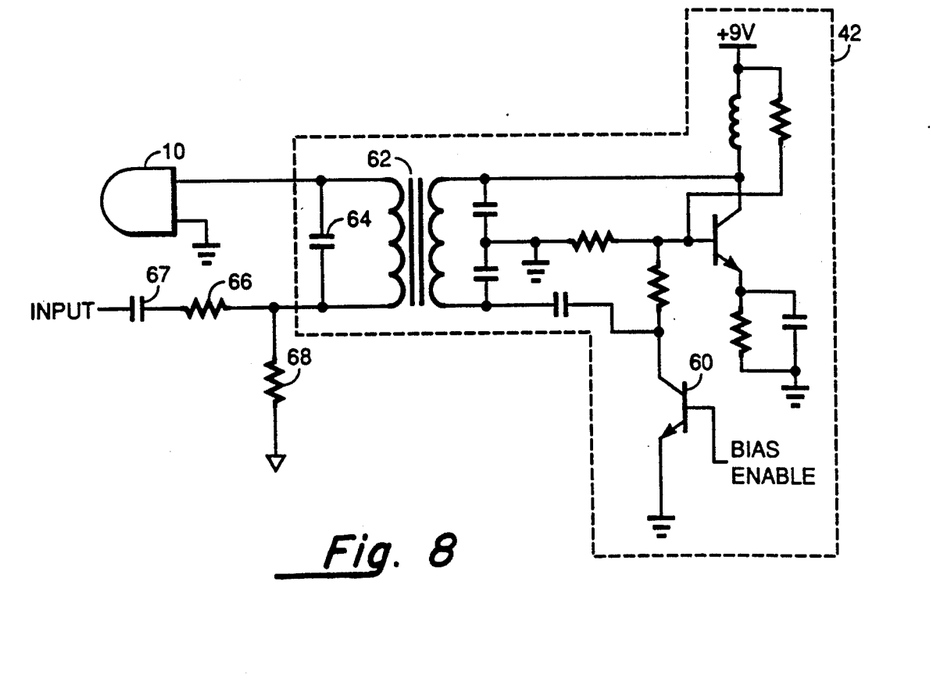
FIG. 8 is a more detailed schematic diagram of the AC bias oscillator for the record head of a magnetic tape device implemented as a Colpitts oscillator.
Figure 9:
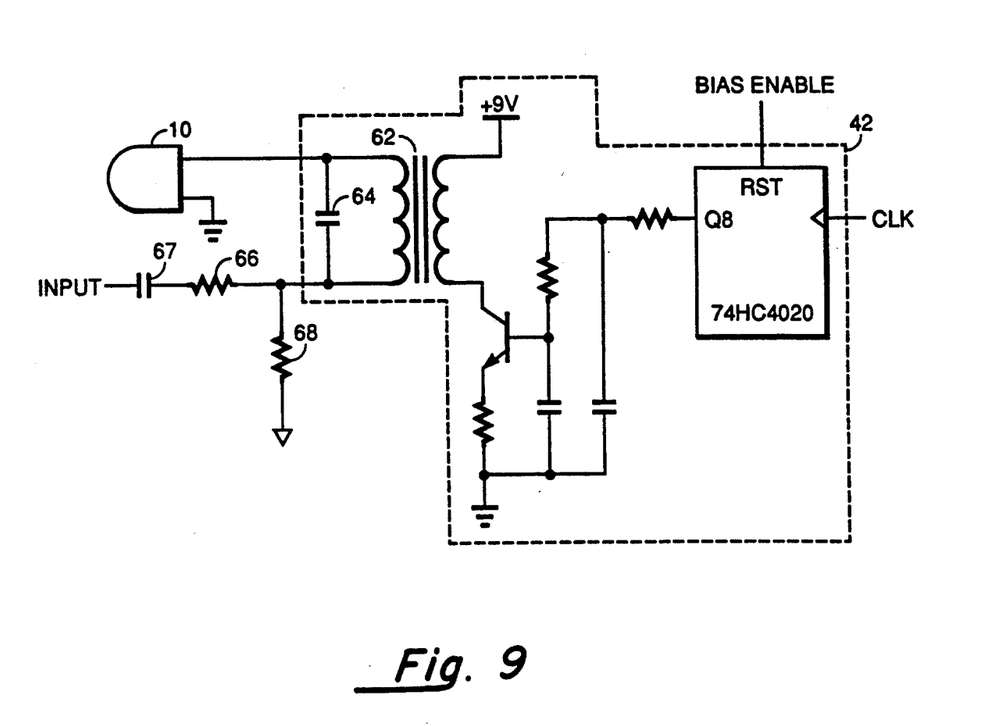
FIG. 9 is a more detailed schematic diagram of the AC bias oscillator for the record head of a magnetic tape device implemented as a master clock divider.

FIG. 6 is a circuit diagram of a Hartley oscillator for one embodiment of an AC bias oscillator 42 in accordance with the present invention. The AC bias oscillator 42 may be implemented using other types of oscillators, such as a Clapp oscillator (FIG. 7), a Colpitts oscillator (FIG. 8) or a master clock divider (FIG. 9). Such implementations of oscillators are well known to those of ordinary skill in this art. In FIG. 6, the AC bias oscillator 42 is enabled by a transistor switch 60 which receives a record control signal. The record control signal turns on the AC bias oscillator when signals are to be recorded. Otherwise, the AC bias oscillator is disabled. In most applications, the record control signal is likely to come from a digital control circuit (not shown). These implementations need not be finely tuned and may provide asymmetric output.

In FIGS. 6-9, the frequency of the oscillator is mostly determined by transformer 62 and capacitor 64. The RMS value can be anything larger than the RMS value appropriate for the record head 10, which is typically greater than 50 volts. The output of the AC bias oscillator 42 can be attenuated as appropriate to the RMS valve appropriate for the record head 10. The input analog signal is fed through series connected resistor 66 and capacitor 67 to the transformer 62, where it is numerically added to the AC bias signal. The combined signal then drives record head 10. Resistor 66 and resistor 68 are used as a voltage divider to place the input analog signal within the range required by the record head 10.

The present invention is applicable not only to telephone answering devices, but to most low-cost magnetic tape devices which typically use solely DC biasing and erasing.

Having now described a number of embodiments of the present invention, it should be apparent to those skilled in the art that the foregoing is illustrative only and not limiting, having been presented by way of example only. Numerous other embodiments and modifications thereof are contemplated as falling within the scope of the present invention as defined by the appended claims and equivalents thereto.

What is claimed is:

1. A biasing and erasing circuit for a magnetic tape recording apparatus for recording an input analog signal on a magnetic tape, the recording apparatus having a record head and an erase head, the circuit comprising:
a DC source connected to the erase head for driving the erase head to erase information from the tape, the DC source comprising a transistor having a base, a collector and an emitter, a resistor connected to the base for receiving an erase enable signal for controlling the transistor, and wherein the erase head has a first terminal connected to the collector and a second terminal connected to a DC supply voltage;
an AC bias oscillator for generating an AC bias signal;
means for combining the AC bias signal with the input analog signal; and
means for applying the combined AC bias signal and input analog signal to the record head.

2. The circuit of claim 1 wherein the means for combining the AC bias signal with the input analog signal includes:
a transformer having a first terminal for receiving the input signal, a second terminal for receiving the AC bias signal and a third terminal for providing the combined signals, and having an inductance;
a capacitor having a capacitance connected electrically in parallel with the transformer from the first terminal to the third terminal; and wherein the frequency of the AC bias signal is determined by the inductance and the capacitance.

3. The circuit of claim 2, wherein the AC bias oscillator is a Hartley oscillator.

4. The circuit of claim 2, wherein the AC bias oscillator is a Colpitts oscillator.

5. The circuit of claim 2, wherein the AC bias oscillator is a Clapp oscillator.

6. The circuit of claim 2, wherein the AC bias oscillator is a master-clock divider oscillator.

7. A biasing and erasing circuit for a magnetic tape recording apparatus for recording an input analog signal on a magnetic tape, the recording apparatus having a record head and an erase head, the circuit comprising:
a DC source connected to the erase head for providing a DC bias to the erase head to erase information from the tape, the DC source comprising a transistor having a base, a collector and an emitter, a resistor connected to the base for receiving an erase enable signal for controlling the transistor, and a resistor connected between the collector and a DC supply voltage, wherein the collector provides the DC bias to the erase head;
an AC bias oscillator for generating an AC bias signal;
means for combining the AC bias signal with the input analog signal; and
means for applying the combined AC bias signal and input analog signal to the record head.

8. A circuit for generating a bias signal and an erase signal for use in a recording apparatus having a record head for recording on a magnetic tape information represented by an input analog signal and having an erase head for erasing information from the tape, the generating circuit comprising:
control means for generating an erase control signal and a record control signal;
means responsive to the erase control signal for applying a DC erase signal to the erase head to cause the erase head to erase information from the tape, the DC erase signal applying means comprising a transistor having a base, a collector and an emitter, a resistor connected to the base for receiving the erase control signal for controlling the transistor, and a resistor connected between the collector and a DC supply voltage, wherein the collector provides the DC erase signal to the erase head;
means for generating an AC bias signal; a signal combiner responsive to the input analog signal and to the AC bias signal for generating a record signal; and
means responsive to the record control signal for applying the record signal to the record head to cause the record head to record information on the tape.

9. The circuit of claim 8 wherein the signal combiner includes:
   a transformer having a first terminal for receiving the input analog signal, a second terminal for receiving the AC bias signal and a third terminal for providing the record signal, and having an inductance;
   a capacitor having a capacitance connected electrically in parallel with the transformer from the first terminal to the third terminal; and wherein the frequency of the AC bias signal is determined by the inductance and the capacitance.

10. The circuit of claim 9, wherein the means for generating the AC bias signal is a Hartley oscillator.

11. The circuit of claim 9, wherein the means for generating the AC bias signal is a Colpitts oscillator.

12. The circuit of claim 9, wherein the means for generating the AC bias signal is a Clapp oscillator.

13. The circuit of claim 9, wherein the means for generating the AC bias signal is a master-clock divider oscillator.

14. A circuit for generating a bias signal and an erase signal for use in a recording apparatus having a record head for recording on a magnetic tape information represented by an input analog signal and having an erase head for erasing information from the tape, the generating circuit comprising:
   control means for generating an erase control signal and a record control signal;
   means responsive to the erase control signal for applying a DC erase signal to the erase head to cause the erase head to erase information from the tape, the means for applying a DC erase signal comprising a transistor having a base, a collector and an emitter, a resistor connected to the base for receiving the erase control signal for controlling the transistor, and wherein the record head has a first terminal connected to the collector and a second terminal connected to a DC supply voltage;
   means for generating an AC bias signal;
   a signal combiner responsive to the input analog signal and to the AC bias signal for generating a record signal; and
   means responsive to the record control signal for applying the record signal to the record head to cause the record head to record information on the tape.

15. A circuit for generating a bias signal and an erase signal for use in a recording apparatus having a record head for recording on a magnetic tape information represented by an input analog signal and having an erase head for erasing information from the tape, the generating circuit comprising:
   a controller for generating an erase control signal and a record control signal;
   a DC source responsive to the erase control signal for applying a DC erase signal to the erase head to cause the erase head to erase information from the tape, the DC source comprising a transistor having a base, a collector and an emitter, a resistor connected to the base for receiving the erase control signal for controlling the transistor, and wherein the erase head has a first terminal connected to the collector and a second terminal connected to a DC supply voltage;
   an AC bias oscillator for generating an AC bias signal;
   a signal combiner responsive to the input analog signal and to the AC bias signal for generating a record signal; and
   an amplifier to the record control signal for driving the record head with the record signal to cause the record head to record information on the tape.

16. The circuit of claim 15 wherein the signal combiner includes:
   a transformer having a first terminal for receiving the input analog signal, a second terminal for receiving the AC bias signal and a third terminal for providing the record signal, and having an inductance;
   a capacitor having a capacitor connected electrically in parallel with the transformer from the first terminal to the third terminal; and wherein the frequency of the AC bias signal is determined by the inductance and the capacitance.

17. The circuit of claim 16, wherein the AC bias oscillator is a Hartley oscillator.

18. The circuit of claim 16, wherein the AC bias oscillator is a Colpitts oscillator.

19. The circuit of claim 16, wherein the AC bias oscillator is a Clapp oscillator.

20. The circuit of claim 16, wherein the AC bias oscillator is a master-clock divider oscillator.

21. A circuit for generating a bias signal and an erase signal for use in a recording apparatus having a record head for recording on a magnetic tape information represented by an input analog signal and having an erase head for erasing information from the tape, the generating circuit comprising:
   a controller for generating an erase control signal and a record control signal;
   a DC source responsive to the erase control signal for applying a DC erase signal to the erase head to cause the erase head to erase information from the tape, the DC source comprising a transistor having a base, a collector and an emitter, a resistor connected to the base for receiving the erase control signal for controlling the transistor, and a resistor connected between the collector and a DC supply voltage, wherein the collector provides the DC erase signal to the erase head;
   an AC bias oscillator for generating an AC bias signal;
   a signal combiner responsive to the input analog signal and to the AC bias signal for generating a record signal; and
   an amplifier to the record control signal for driving the record head with the record signal to cause the record head to record information on the tape.

22. The circuit of claim 1, wherein the biasing and erasing circuit is incorporated in a magnetic tape recording apparatus.

23. The circuit of claim 22, wherein the magnetic tape recording apparatus is a telephone answering device.

24. The circuit of claim 8, wherein the biasing and erasing circuit is incorporated in a magnetic tape recording apparatus.

25. The circuit of claim 24, wherein the magnetic tape recording apparatus is a telephone answering device.

26. The circuit of claim 15, wherein the biasing and erasing circuit is incorporated in a magnetic tape recording apparatus.

27. The circuit of claim 26, wherein the magnetic tape recording apparatus is a telephone answering device.

28. A method for biasing and erasing for a magnetic tape recording apparatus for recording an input analog signal on a magnetic tape, the recording apparatus having a record head and an erase head, the method comprising the steps of:

generating a record control signal and an erase control signal;

applying a DC erase signal to the erase head in response to the erase control signal;

generating an asymmetric AC bias signal in response to the record control signal;

combining the input analog signal with the AC bias signal to generate a record signal; and applying the record signal to the record head to record information on the tape.

* * * * *